US011966335B2

(12) United States Patent
Puranik et al.

(10) Patent No.: US 11,966,335 B2
(45) Date of Patent: Apr. 23, 2024

(54) HARDWARE INTERCONNECT WITH MEMORY COHERENCE

(71) Applicant: Google LLC, Mountain View, CA (US)

(72) Inventors: Kiran Suresh Puranik, Fremont, CA (US); Prakash Chauhan, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 17/876,110

(22) Filed: Jul. 28, 2022

(65) Prior Publication Data

US 2023/0052808 A1     Feb. 16, 2023

Related U.S. Application Data

(60) Provisional application No. 63/231,397, filed on Aug. 10, 2021.

(51) Int. Cl.
*G06F 12/0815* (2016.01)

(52) U.S. Cl.
CPC .... *G06F 12/0815* (2013.01); *G06F 2212/301* (2013.01)

(58) Field of Classification Search
None
See application file for complete search history.

(56) References Cited

U.S. PATENT DOCUMENTS

| | | | |
|---|---|---|---|
| 6,721,813 B2 | 4/2004 | Owen et al. | |
| 9,996,487 B2 | 6/2018 | Niell et al. | |
| 2002/0103948 A1 | 8/2002 | Owen et al. | |
| 2004/0221071 A1* | 11/2004 | Baker | G06F 13/124 710/20 |
| 2005/0144397 A1* | 6/2005 | Rudd | G06F 12/0815 711/144 |
| 2016/0092360 A1* | 3/2016 | Moll | G06F 12/0895 711/144 |
| 2018/0210833 A1* | 7/2018 | Schlansker | G06F 12/0815 |
| 2019/0042455 A1 | 2/2019 | Agarwal et al. | |
| 2021/0240655 A1 | 8/2021 | Das Sharma | |

OTHER PUBLICATIONS

Extended European Search Report for European Patent Application No. 22189590.7 dated Dec. 21, 2022. 5 pages.
Office Action for European Patent Application No. 22189590.7 dated Nov. 23, 2023. 9 pages.

\* cited by examiner

*Primary Examiner* — Nathan Sadler
(74) *Attorney, Agent, or Firm* — Lerner David LLP

(57) ABSTRACT

Aspects of the disclosure are directed to hardware interconnects and corresponding devices and systems for non-coherently accessing data in shared memory devices. Data produced and consumed by devices implementing the hardware interconnect can read and write directly to a memory device shared by multiple devices, and limit coherent memory transactions to relatively smaller flags and descriptors used to facilitate data transmission as described herein. Devices can communicate less data on input/output channels, and more data on memory and cache channels that are more efficient for data transmission. Aspects of the disclosure are directed to devices configured to process data that is read from the shared memory device. Devices, such as hardware accelerators, can receive data indicating addresses for different data buffers with data for processing, and non-coherently read or write the contents of the data buffers on a memory device shared between the accelerators and a host device.

13 Claims, 9 Drawing Sheets

HARDWARE INTERCONNECT WITH MEMORY COHERENCE

CROSS REFERENCE TO RELATED APPLICATIONS

This application claims the benefit of the filing date of U.S. Provisional Patent Application No. 63/231,397 filed Aug. 10, 2021, the disclosure of which is hereby incorporated herein by reference.

BACKGROUND

Hardware interconnects are interfaces for transmitting data between computing devices. Hardware interconnects can be standardized, both in the hardware used to connect a device to a data bus, as well as in various protocols that devices compatible with certain types of hardware interconnects are configured to perform for transmitting data across the data bus. Different hardware interconnects can be designed for specific types of connecting devices, e.g., a hardware accelerator to a host computing device housing the hardware accelerator, a host computing device to a memory device, or a hardware accelerator to memory device. Hardware interconnect standards include Peripheral Component Interconnect (PCI), which includes several variants. Another example of a hardware interconnect standard is Compute Express Link™ (CXL), which provides for memory coherence protocols in memory devices shared between CXL-compatible devices.

Memory coherence is an issue related to computing systems in which multiple devices read from and/or write to the same memory device. The devices can also include local memory, e.g., a local cache, for temporarily storing the contents of the memory device. If one device caches data from the memory device that is later updated by another device, the first device will have an outdated copy of the data in its local cache. Memory coherence protocols mitigate the chance of devices working on outdated copies of data, for example by verifying the contents of local caches of the multiple devices when data stored in the memory device is rewritten and causing the local caches to be updated as necessary. These protocols are used to coherently read and write data from and to a shared device, as opposed to non-coherent reading and writing, in which these protocols are not applied. Memory coherence protocols add additional computational overhead but are needed in some cases to prevent devices from processing outdated data.

BRIEF SUMMARY

Aspects of the disclosure are directed to hardware interconnects and corresponding devices and systems for non-coherently accessing data in shared memory devices. Data produced and consumed by devices implementing the hardware interconnect can read and write directly to a memory device shared by multiple devices, and reduce the number and extent of coherent memory transactions to relatively smaller control information, including flags and descriptors used to facilitate data transmission as described herein.

Devices can communicate less data on input/output (I/O) channels, and more data on memory and cache channels of a hardware interconnect that are more efficient for data transmission. Aspects of the disclosure are directed to devices configured to process data that is read from the shared memory device. Devices, such as hardware accelerators, can receive data indicating addresses for different data buffers with data for processing, and non-coherently read or write the contents of the data buffers on a memory device shared between the accelerators and a host device.

An aspect of the disclosure is directed to a first computing device including: a first cache; one or more processors coupled to a first memory device shared between the first computing device and a second computing device, the one or more processors are configured to: cache control information in the first cache, the control information including one or more flags indicating the status of one or more data buffers in the memory device and accessed from a second memory device connected to the second computing device; non-coherently read or write contents of the one or more data buffers based on the control information, and after non-coherently reading or writing the contents of the one or more buffers, coherently write updated control information to the second memory device, wherein coherently writing the updated control information causes the control information in the first or second cache to also be updated.

The foregoing and other aspects of the disclosure can include one or more of the following features. In some examples, aspects of the disclosure include all of the features together in combination.

The first computing device can be configured to communicate with the second computing device over a hardware interconnect including a plurality of channels and configured for memory-coherent data transmission; and wherein the one or more processors are further configured to: coherently read or write the control information over a first channel dedicated to input/output (I/O) data communication; non-coherently read or write the contents of the one or more data buffers over a second channel dedicated to communication between memory devices connected to the first or second computing device.

To coherently write the updated control information to the second memory device, the one or more processors are configured to cause the updated control information to be sent to the second cache of the second memory device over a third channel dedicated to updating contents of the first or second cache.

The one or more processors can be further configured to: receive, over the I/O channel, a command descriptor, the command descriptor including respective addresses for a source data buffer and a destination data buffer in the first memory device; cache the respective addresses for the source and destination data buffers to the first cache; and non-coherently read or write the contents of the source and destination data buffer using the respective cached addresses.

The first computing device can be a hardware accelerator device including one or more accelerator cores and the first cache is an accelerator cache for the hardware accelerator device.

The one or more processors can be configured to non-coherently read the contents of the one or more data buffers based on the value of one or more of the plurality of flags indicating that the contents of the one or more data buffers are ready for consumption.

One or more of the plurality of flags can be set by the second computing device configured to write the contents to the one or more data buffers.

The control information can further include data descriptors, each data descriptor identifying an address for a respective source data buffer for the first computing device to read from, or for a respective destination data buffer for the first computing to write to.

An aspect of the disclosure is directed to a system including a host device and an accelerator communicatively coupled over a hardware interconnect supporting memory-coherent data transmission between the host device and the accelerator, the host device including a host cache and the accelerator including an accelerator cache; wherein the host device is configured to: read or write data to one or more data buffers to a first memory device shared between the host device and the accelerator, write control information to a second computing device, the control information including one or more flags indicating the status of one or more data buffers in the first memory device; and wherein the accelerator is configured to: non-coherently read or write data from or to the one or more data buffers of the first memory device based on the control information, and after non-coherently reading or writing the data, coherently write updated control information to the second memory device, wherein coherently writing the updated control information causes the control information in the host cache to be updated.

Aspects of the disclosure can include the following features, alone or in combination with other features described herein. In some examples, an aspect of the disclosure includes all of the described features in combination.

The accelerator can be further configured to receive, at an enqueue register, one or more command descriptors, each command descriptor specifying a respective data descriptor in the accelerator cache, and wherein to non-coherently read or write data from or to the one or more data buffers, the accelerator is configured to read addresses from the one or more command descriptors corresponding to the one or more data descriptors.

The accelerator can be configured to receive the one or more command descriptors as a deferred memory write (DMWr) transaction.

The one or more command descriptors can be received from an application executed on a virtual machine hosted by the host device.

The hardware interconnect can include a plurality of channels; and wherein the accelerator is configured to: receive the one or more command descriptors over a first channel of the plurality of channels dedicated to input/output data communication; and non-coherently read or write data from or to the one or more data buffers over a second channel of the plurality of channels dedicated to communication between memory devices connected to the first or second computing devices.

To coherently write the updated control information to the second memory device, the accelerator can be further configured to cause the updated control information to be sent to the host cache of the host device over a third channel of the plurality of channels dedicated to updating contents of the accelerator or host cache.

An aspect of the disclosure is directed to one or more non-transitory computer-readable storage media encoded with instructions that, when executed by one or more processors of a first computing device including a first cache and coupled to a first memory device shared between the first computing device and a second computing device, causes the one or more processors to perform operations including: caching control information in the first cache, the control information including one or more flags indicating the status of one or more data buffers in the memory device and accessed from a second memory device connected to the second computing device; non-coherently reading or writing contents of the one or more data buffers based on the control information, and after non-coherently reading or writing the contents of the one or more buffers, coherently write updated control information to the second memory device, wherein coherently writing the updated control information causes the control information in the first or second cache to also be updated.

The first computing device is configured to communicate with the second computing device over a hardware interconnect including a plurality of channels and configured for memory-coherent data transmission, and wherein the operations further include: coherently reading or writing the control information over a first channel dedicated to input/output (I/O) data communication, and non-coherently reading or writing the contents of the one or more data buffers over a second channel dedicated to communication between memory devices connected to the first or second computing device.

Coherently writing the updated control information to the second memory device can include causing the updated control information to be sent to the second cache of the second memory device over a third channel dedicated to updating contents of the first or second cache.

The operations can further include receiving, over the I/O channel, a command descriptor, the command descriptor including respective addresses for a source data buffer and a destination data buffer in the first memory device; caching the respective addresses for the source and destination data buffers to the first cache; and non-coherently reading or writing the contents of the source and destination data buffer using the respective cached addresses.

The first computing device is a hardware accelerator device including one or more accelerator cores and the first cache is an accelerator cache for the hardware accelerator device.

The operations can further include non-coherently reading the contents of the one or more data buffers based on the value of one or more of the plurality of flags indicating that the contents of the one or more data buffers are ready for consumption.

DETAILED DESCRIPTION

Figure 1:
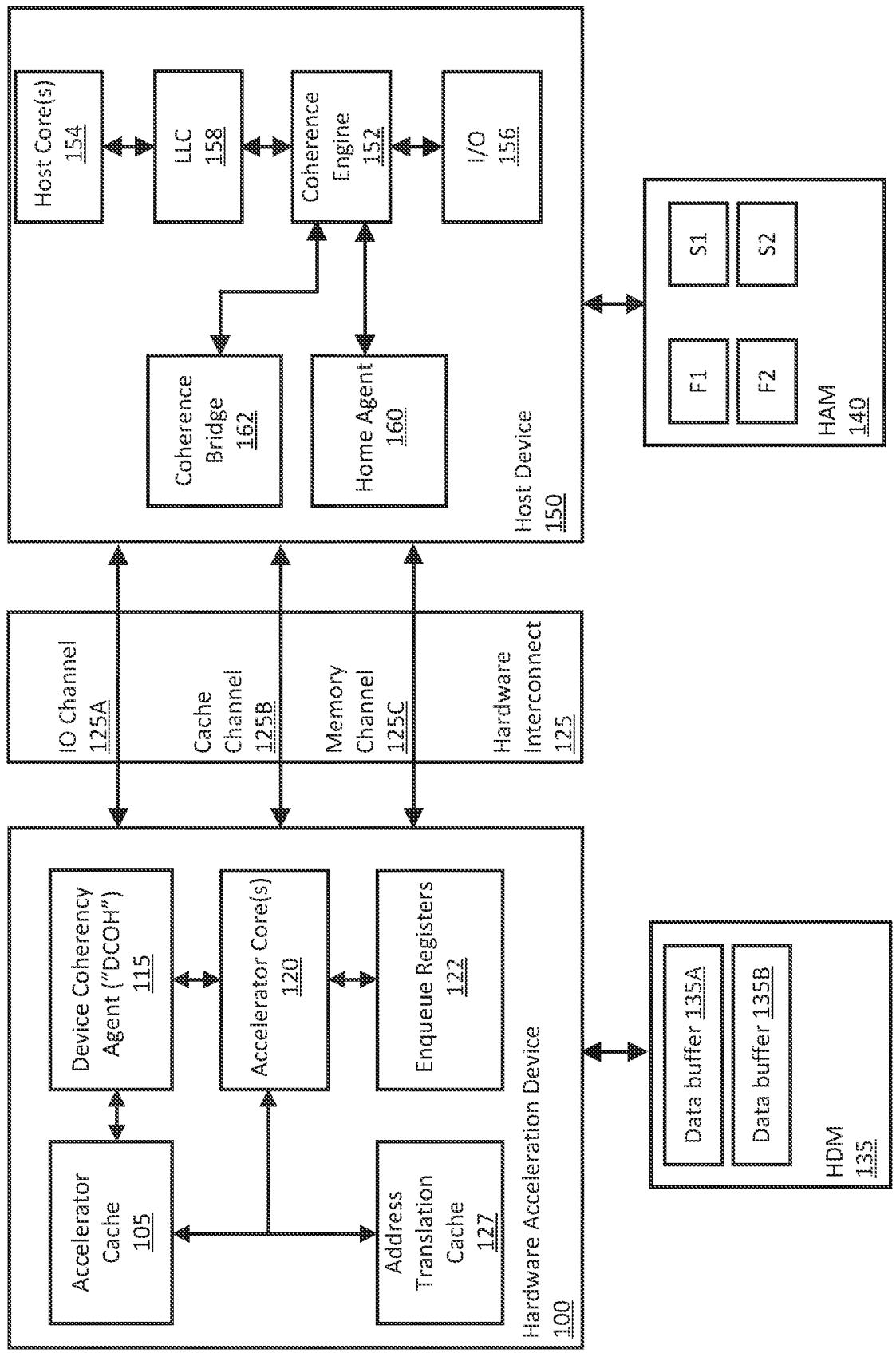
FIG. 1 is a block diagram of a hardware acceleration device and a host device communicating across a hardware interconnect, according to aspects of the disclosure.

Overview:

Aspects of the disclosure are directed to hardware and/or software for implementing a hardware interconnect for communicating data between a host device and one or more hardware acceleration devices (accelerators) or other devices. Devices, e.g., accelerators, configured as described herein can non-coherently access data buffers in shared memory devices. Memory coherence is an issue related to computing systems in which multiple devices read from and/or write to the same memory device. If one device caches data from the memory device that is later updated by another device, the first device will have an outdated copy of the data in its local cache. Memory coherence protocols mitigate the chance of devices working on outdated copies of data, for example by verifying the contents of local caches of the multiple devices when data stored in the memory device is rewritten and causing the local caches to be updated as necessary. These protocols are used to coherently read and write data from and to a shared device, as opposed to non-coherent reading and writing, in which these protocols are not applied.

Data produced and consumed by devices implementing the hardware interconnect as described herein can read and write directly to a memory device shared by multiple devices, and limit coherent memory transactions to flags and descriptors used to facilitate data transmission as described herein. Aspects of the disclosure are directed to one or more devices configured to execute a control flow to receive requests to process data that is read from the shared memory device.

A host device can include a number of processing units, cache controllers, and be coupled to host-attached memory (HAM). An accelerator, such as a graphics processing unit (GPU), tensor processing unit (TPU), video processing unit (VPU), or other types of application-specific integrated circuits (ASIC), can communicate data with the host device over a data bus. The accelerator device can include several accelerated processing units or cores, an accelerator cache, and be coupled to host-managed device memory (HDM) for reading and writing data while performing accelerated operations, e.g., matrix multiplication, or multiply-accumulate operations.

The hardware interconnect can have multiple channels for transmitting different types of data to and from connected devices. For example, some channels may be reserved for communicating input/output (I/O), commands, or other control information, e.g., flags or descriptors, etc., to a device, while other channels may be dedicated to transferring data for processing to and from connected devices. Data communicated over a cache channel can be communicated between local caches for host devices and connected accelerators or other devices. Data can be communicated over an I/O channel to communicate commands for initializing and communicating with I/O devices, such as network interface cards (NICs). Data communicated over a memory channel can include data accessed from the HDM or other memory attached to the host device or the accelerator. Under this channel, data is communicated using commands issued by the host device as a leader, to the accelerator as a follower.

The hardware interconnect can specify a particular protocol for transmitting data across each channel. Devices configured to communicate data over a data bus and using the hardware interconnect can be configured to communicate data over the multiple channels according to the respective protocol for the applied channel.

Aspects of the disclosure provide for a hardware interconnect between a host device and an accelerator that reduces the amount of data transferred over an I/O channel to descriptors and flags, as described below. Instead, the host device and the accelerator can use the memory channel to communicate more data over the relatively inefficient I/O channel. The host device and accelerators configured according to aspects of the disclosure non-coherently access data in host-managed device memory, and only cache data from host-attached memory in a corresponding accelerator cache for the accelerator. Data from the host-managed device memory is not cached in the accelerator cache, reserving the cache for flags and/or descriptors specifying memory addresses of data buffers for reading from or writing to. A data producer, e.g., the host device, eliminates the need to manage a data buffer copy of data transferred to a consumer, e.g., the accelerator, by writing directly to the host-managed device memory. Subsequently, a consumer, e.g., the accelerator, can read directly from the HDM.

Because a data buffer copy for transferred data is not necessary, applications, e.g., executed on guest operating systems of virtual machines in communication with an accelerator, can perform with less latency, e.g., measured in clock time or processing cycles. This is in contrast to other approaches in which the data buffer copy is created, which requires additional processing cycles to perform, which can add up in the aggregate when applications send many requests or queries a minute.

A computing platform implementing host devices and accelerators as described herein can operate with improved power efficiency, at least because the aforementioned elimination of data buffer copies reduces the number of operations that the platform has to perform to respond to requests to process data on the accelerators. Power efficiency can also be improved because more data is transferred over a memory channel to communicate data from attached memory devices of a host device, as compared with an I/O channel.

The accelerator cache stores descriptors and control flags, which, as described herein, are used to fetch corresponding data referenced in the descriptors and located in the HAM. The size of the accelerator cache can be linear to the number of accelerator cores of an accelerator, reducing the need for expensive cache memory.

Aspects of the disclosure also include an accelerator configured to implement a control flow process that reduces the amount of data transferred over the I/O channel over other hardware interconnects with separate channels for input/output and data transmission. The accelerator can receive one or more command descriptors that can be queued in a corresponding command queue for the accelerator. The command descriptor(s) includes memory pointers to data descriptors locally cached on the accelerator and can include information for performing a requested operation on the accelerator, e.g., the source and destination addresses for processed data, semaphore flags, and command information. The accelerator can non-coherently read and write the data at the one or more data buffers whose addresses are included in the data descriptor over the memory channel Hardware configured to communicate data over multiple channels and using memory coherence protocols, e.g., bus snooping, hardware synchronization, directory-based protocols, can be augmented according to aspects of the disclosure.

Example Systems

FIG. 1 is a block diagram of a hardware acceleration device (accelerator) 100 and a host device 150 communicating across a hardware interconnect 125, according to aspects of the disclosure. The accelerator 100 can be any of a variety of different types of hardware acceleration devices, e.g., a GPU, a field-programmable gate array (FPGA), or any type of ASIC, such as a TPU or VPU. In various examples, the host device 150 communicates with any of a variety of other devices besides accelerators configured to transmit data over the hardware interconnect as described herein.

The accelerator 100 can include an accelerator cache 105 managed by a cache controller 110. The accelerator cache 105 can be any of a variety of different types of memory, e.g., an L1 cache, and be of any of a variety of different sizes, e.g., 8 kilobytes to 64 kilobytes. The accelerator cache 105 is local to the accelerator 100. A cache controller (not shown) can read from and write to contents of the accelerator cache 105, which may be updated many times throughout the execution of operations by the accelerator 100.

The accelerator 100 can include a device coherency agent (DCOH) 115. The DCOH 115 is configured to manage bias states, e.g., device bias and host bias modes, described in more detail herein with reference to FIGS. 2-3. The hardware interconnect 125 can support a bias switch to preferentially transfer data, depending on the current mode. In device bias mode, the accelerator 100 can communicate directly with the HDM 135 without communicating first with a coherence engine 152, configured to handle operations related to preserving memory coherence among memory devices shared by the host device 150 and the accelerator 100. In host bias mode, the accelerator 100 communicates with the host device 150 and the coherence engine 152 to read or write data to the HDM 135, providing additional oversight versus device bias mode.

The DCOH 115 is also configured to update, e.g., directly or through a cache controller, the contents of the accelerator cache 105 as part of maintaining memory coherence between the contents of the accelerator cache 105 and other memory devices shared by the accelerator 100 and other devices.

The accelerator 100 can include one or more accelerator cores 120. The accelerator core(s) 120 can be individual processing units, e.g., processing cores or one or more integrated circuits, configured for performing hardware accelerated operations. In some examples, the accelerator 100 can host multiple individual hardware acceleration devices, each of which may have one or more cores.

HDM 135 can include one or more memory devices communicatively coupled to the accelerator 100, and one or more other devices. HAM 140 can be any of a variety of different memory devices attached or connected to the host device 150. Example memory devices can include solid state drives, RAM, hard drives, and any combination of volatile and non-volatile memory. The HDM 135 and HAM 140 can also be connected to one or more other memory devices and/or computing devices with one or more processors, e.g., other host devices or other accelerators.

Figure 2:
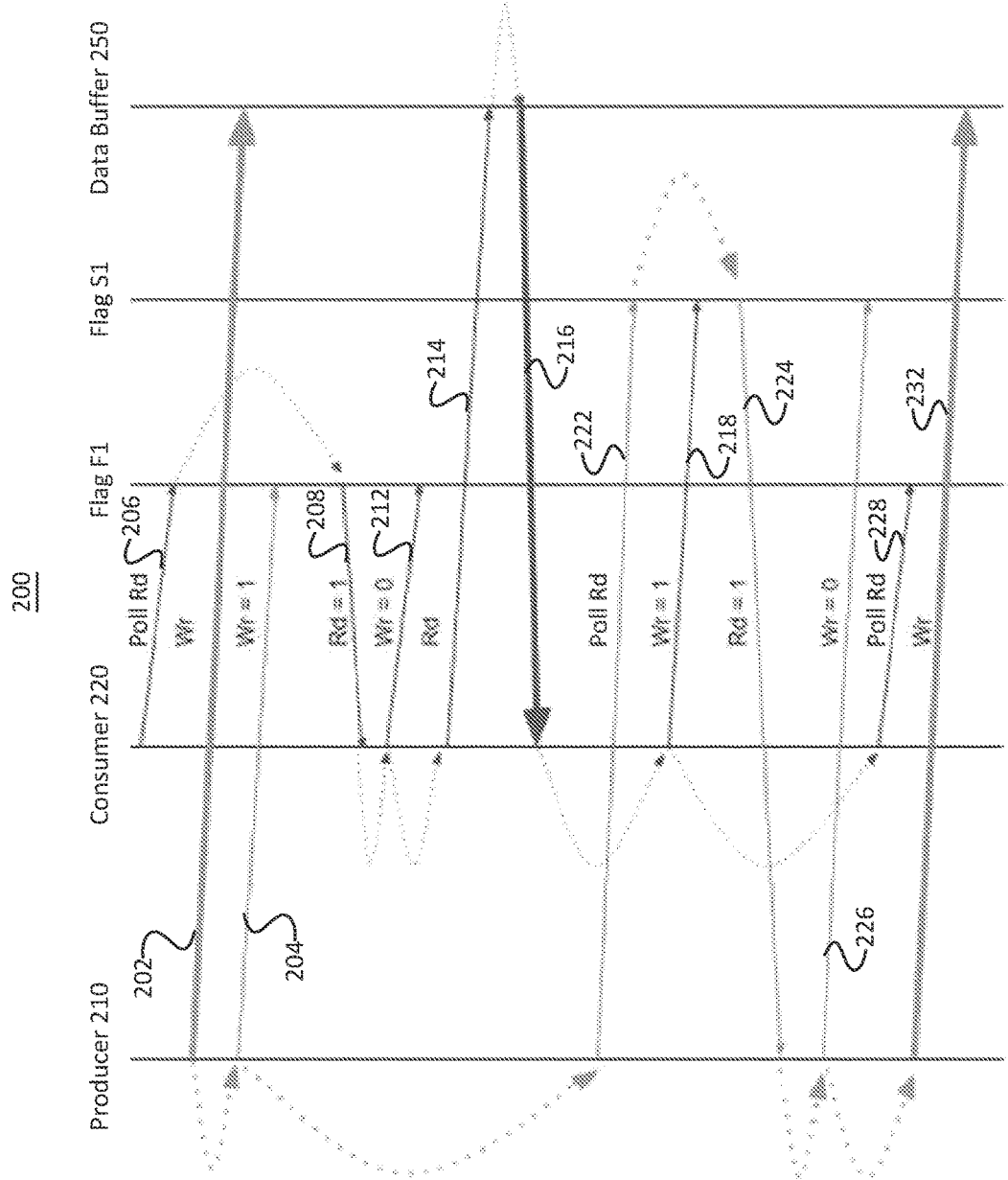
FIG. 2 is a flow chart of an example producer-consumer process for data transmission between a host device and an accelerator, according to aspects of the disclosure.
Figure 3:
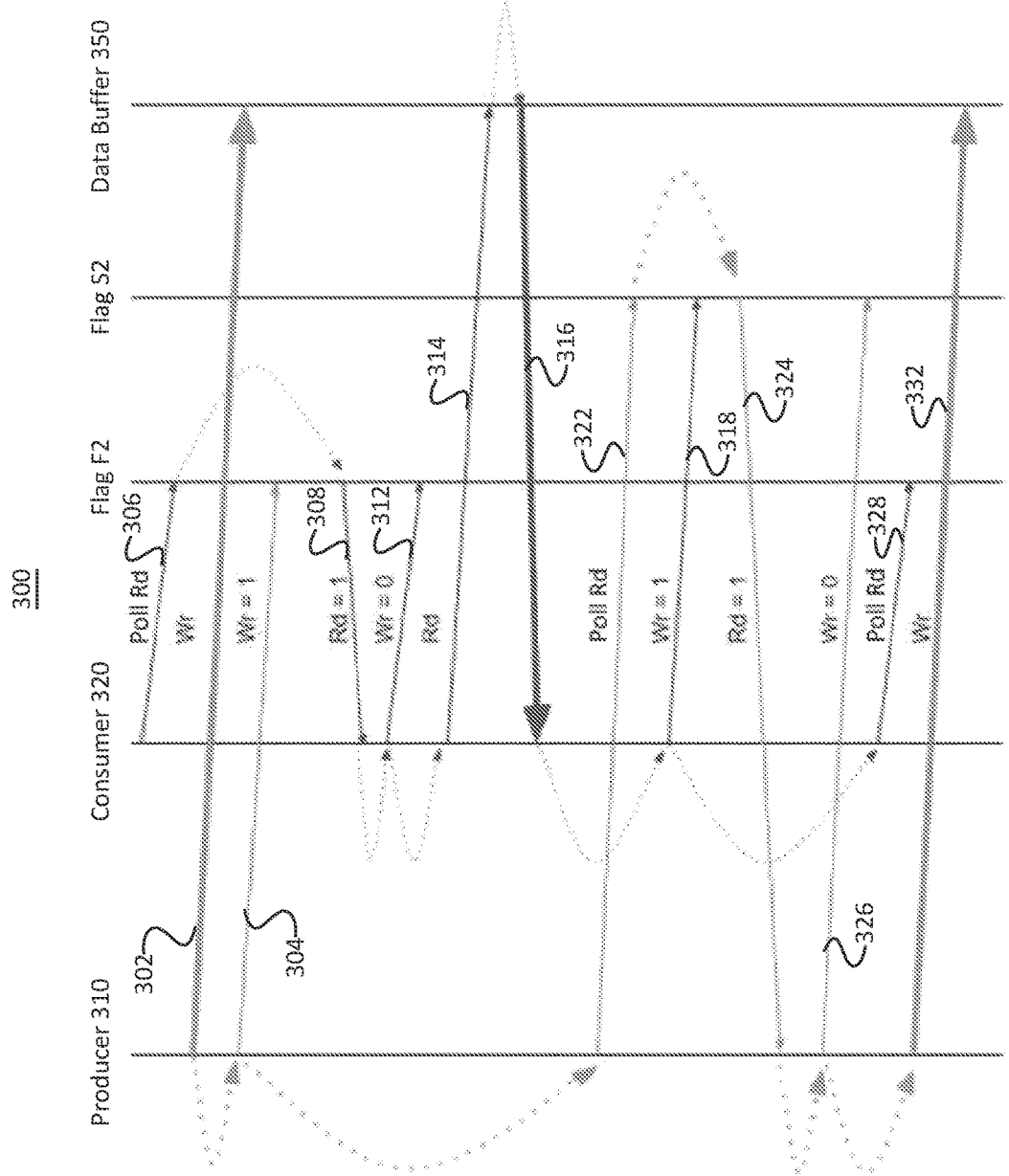
FIG. 3 is a flow chart of another example producer-consumer process for data transmission between a host device and an accelerator, according to aspects of the disclosure.

As described in more detail herein with reference to FIGS. 2-3, the HAM 140 can store different flags F1, F2, S1, and S2 used by the host device 150 and the accelerator 100 for performing non-coherent reads and writes directly from and to the HDM 135, according to aspects of the disclosure.

Flags can be bit flags or represented as some fixed amount of data, with a binary state to indicate when the flag is set or cleared. The accelerator 100 can store the values of the flags in the accelerator cache 105, and update the flags to track when data is ready to be consumed or when data is ready to be written again, depending on whether the accelerator 100 is functioning as a data consumer or data producer.

The DCOH 115 can be implemented in hardware and/or software and be configured to manage coherent and non-coherent memory accesses to and from the HDM 135 and the HAM 140. Example processes for coherent and non-coherent memory accesses are described herein with reference to FIGS. 2-3.

The core(s) 120 can each be connected to one or more enqueue registers 122. As described herein with reference to FIGS. 5-7, the core(s) 120 can receive commands to process data from one or more sources, e.g., applications running on guest operating systems of one or more virtual machines communicating with the accelerator 100 along the same hardware interconnect 125. The accelerator 100 can also include an address translation cache 127 configured for storing memory addresses translated from virtual to physical memory.

The host device 150 can include one or more host cores 154, an I/O circuit 156, a last level cache (LLC) 158, a home agent 160, the coherence engine 152, a coherence bridge 162. The host core(s) 154 can be any of a variety of different circuits or processing cores, e.g., cores of a central processing unit. The LLC 158 can be cache memory to which the host device 150 stores the status of the flags in the HAM 140, as described herein with reference to FIGS. 2-3. During a coherent write to the flags in the HAM 140, the contents of the LLC 158 are also updated. The home agent 160 can be configured to implement any of a variety of protocols for managing memory coherency between caches or memory devices of the host device 150 and connected accelerators, e.g., the accelerator 100.

The coherence bridge 162 can include one or more circuits configured for implementing one or more protocols for communicating data along the hardware interconnect 125, including protocols for how and what type of data is communicated through the I/O channel 125A, the cache channel 125B, and the memory channel 125C. The DCOH 115 on the device 100 can also implement various protocols for communicating data over the channels 125A-C.

Instead of caching the contents of data buffers 135A, 135B in the HDM 135 to the accelerator cache 105, the accelerator 100 can cache the flags stored in the HAM 140 and read or write directly to the HDM 135. For each core 120, the HAM 140 can store a corresponding set of flags (F1, F2, S1, S2). In some examples, an accelerator designed to implement the hardware interconnect 125 as described herein can be designed with an accelerator cache 105 linear in size to the number of cores 120 implemented by the accelerator 100. For example, if each flag is encoded in x bits, then the total amount of memory needed to represent flags for y cores is x*y. As accelerator cache is generally made up of high-performance memory that is costly to implement, the hardware interconnect 125 as described herein allows for corresponding devices implementing the interconnection 101 to include less accelerator cache over devices implementing other interconnections.

FIG. 2 is a flow chart of an example producer-consumer process 200 for data transmission between a host device and an accelerator, according to aspects of the disclosure.

As shown in FIG. 1, the HAM 140 can store several flags F1, F2, S1, and S2 that are used for managing non-coherent reading and writing to the HDM 135. The example producer-consumer processes 200, 300 as shown in FIGS. 2-3 illustrate how accelerators can be configured to read and write directly to the HDM in a non-coherent manner, even when the HDM itself is shared among other devices.

In one example, the producer is a host device. The producer 210 allocates memory in an HDM for a data buffer 250. The HDM can be connected to a consumer 220, e.g., an accelerator. The producer 210 writes to the data buffer 250, according to line 202. The size of the data buffer 250 can vary from implementation to implementation, for example depending on the nature of the data being written or the operations to be performed by the consumer 220 on the written data. Memory pages in the HDM allocated to the data buffer 250 are initially set to host bias mode. As part of allocating memory for the data buffer 250, the last level cache of the producer 210 can be initialized with default values for the flags, and updated as flags are set or cleared.

For example, the host device executes one or more operations to write data to the first data buffer in the HDM over the memory channel. Data is also written to the last level cache of the host device. In some examples, instead of the host device writing to the first data buffer as the producer 210, an I/O device, e.g., a sensor unit collecting sensor data from an environment proximate to the sensor unit, can instead write to the data buffer 250. In those examples, a "no snoop" setting can be used to prevent data from also being written to the last level cache of the host device.

The producer 210 sets the flag F1 allocated in the HAM to indicate that the data buffer 250 is available, according to line 204. The flag F1 is set to indicate that the contents of the data buffer 250 are ready to be consumed by a consumer 220.

When the consumer 220, e.g., an accelerator, is ready to consume data from the HDM, the consumer polls the flag F1 in the HAM, according to line 206. The accelerator cache of the consumer 220 can be initialized with default values of the flags F1 and S1, e.g., 0, and updated when polling the HAM and detecting that the values of the flags F1 or S1 have been changed. After the flag F1 is polled, the cache line in the accelerator cache including the flag F1 is invalidated, and an updated cache line is pushed into the last level cache of the producer 210, over the cache channel of the hardware interconnect.

The producer 210 can set the bias of the memory pages of the data buffer 250 from host bias to device bias mode, as part of preparing the contents of the data buffer 250 to be read. The producer 210 can be configured to set the bias of the memory pages to device bias mode in response to receiving the updated cache line. The memory pages include the data produced by the producer 210 in the data buffer 250 that the consumer 220 will consume.

The consumer 220 detects that the flag F1 is set, according to line 208, and clears the flag F1, according to line 212. The consumer 220 invalidates the cache line containing the flag F1 in the accelerator cache, and an updated cache line is pushed to the accelerator cache over the cache channel. The accelerator cache is updated to maintain coherence between the contents of the accelerator cache and the contents of the HAM.

The consumer 220 non-coherently reads data from the data buffer 250, according to lines 214 and 216. After reading the data, the consumer 220 sets the flag S1 allocated in the HAM, according to line 218. In setting the flag S1, the cache line in the last level cache of the producer 210 is invalidated, and an updated cache line for the new value of the flag S1 is pushed into the last level cache of the producer 210, over the cache channel.

The producer 210 polls the flag S1, according to line 222. When the producer detects that flag S1 has been set, according to line 224, the producer 210 clears the flag, according to line 226. By line 226, the producer 210 and consumer 220 have completed an iteration of memory writing and reading. The consumer 220 can poll the flag F1 again, for the next transfer of data, according to line 228. The producer 210 can write new data to the data buffer, according to line 232. After writing new data to the buffer 250, the producer 210 can set the flag F1 again, which the consumer 220 can continue to poll and detect when set, indicating when the consumer 220 can begin to read the data from the buffer 250 again.

Aspects of the disclosure can provide for a reduction of computational overhead in managing memory coherence, at least because only data from the HAM, e.g., flags, are cached to the accelerator cache of a consuming accelerator. Data from the HDM is never cached in the accelerator cache of a consuming accelerator, reducing or eliminating discrepancies between the two memory locations. Instead, a data producer, e.g., a host device, can write directly to the HDM, and a data consumer, e.g., an accelerator, can read directly from the HDM. By not caching contents of the HDM to the accelerator cache of the consumer, latency is improved, e.g., as measured in processing cycles, at least because the additional writing and reading operations to and from the accelerator cache are eliminated. The reduction of operations for accessing data in the HDM can also improve the power efficiency of the system in which the producer and consumers are implemented, at least because fewer operations performed translations to reduce energy consumption overall.

Data can be shared over a channel of the hardware interconnect that is configured to send and receive data more efficiently than other I/O channels dedicated to receiving and sending commands to one or more accelerators from the host device.

FIG. 3 is a flow chart of another example producer-consumer process 300 for data transmission between a host device and an accelerator, according to aspects of the disclosure.

In the example process 300, a producer 310 is an accelerator and a consumer 320 is a host device. Host devices and accelerators at different points of execution can behave as producers and consumers. A separate set of flags, e.g., F2 and S2, can be managed for a data buffer 350. The producer 320, e.g., the host device, can allocate data buffer 350 in the HDM. Memory pages in the data buffer 350 are set to device bias mode. The data buffer 350 can be allocated concurrently with the data buffer 250 of FIG. 24, or at a different time or location as the data buffer 250. The last level cache of the consumer 320, e.g., the host device, can be initialized with default values for the flags F2 and S2, as part of the buffer allocation.

The producer 310, e.g., the accelerator, non-coherently writes processed data to the data buffer 350, according to line 302. The producer 310 sets the flag F2 in the HAM, according to line 304, indicating that the non-coherent write has ended and that the contents of the data buffer 350 are available. The cache line in the accelerator cache of the producer 310 corresponding to the flag F2 is updated to reflect the change in the flag F2.

The consumer 320 polls the flag F2 in the HAM, according to line 306. Upon detecting that the flag F2 has been set, according to line 308, the consumer 320 clears the flag F2, according to line 312. The cache line in the last level cache of the consumer 320 corresponding to the flag F2 is invalidated, and an updated cache line is pushed to the last level cache to reflect the updated value. Also, memory pages containing the data buffer 350 are moved from device to host bias mode. No action may be needed by the producer 310 to make this switch.

The consumer 320 begins to read the data buffer 350, according to lines 314 and 316. The contents of the data buffer 350 are read over the memory channel of the hardware interconnect. After the contents of the data buffer 350 are read, the consumer 320 sets the flag S2, according to line 318. The cache line in the accelerator cache storing the flag S2 is invalidated. An updated cache line is pushed into the accelerator cache, over the cache channel, reflecting the updated value for the flag S2.

The producer 310 polls the flag S2, according to line 322. When the producer detects that flag S2 has been set, according to line 324, the producer 310 clears the flag, according to line 326. By line 326, the producer 310 and consumer 320 have completed one iteration of memory writing and reading. The consumer 320 can poll the flag F2 again, for the next transfer of data, according to line 328. The producer 310 can write new data to the data buffer 350, according to line 332. After writing new data to the buffer 350, the producer 310 can set the flag F1 again, which the consumer 320 can continue to poll and detect when set, indicating when the consumer 320 can begin to read the data from the buffer 350 again.

Figure 4:
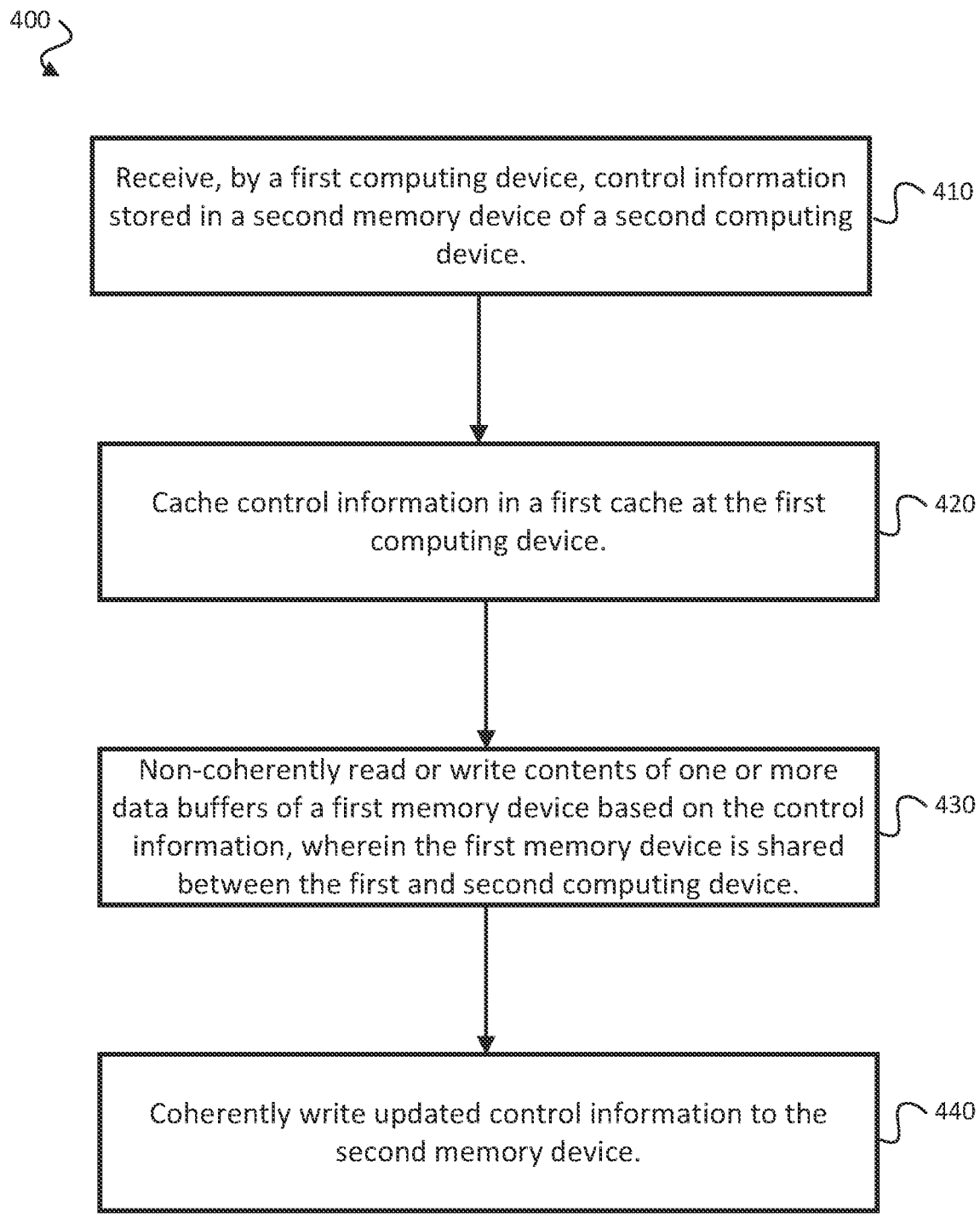
FIG. 4 is a flow chart of an example process for non-coherently reading or writing data to a shared memory device, according to aspects of the disclosure.

FIG. 4 is a flow chart of an example process 400 for non-coherently reading or writing data to a shared memory device, according to aspects of the disclosure.

A first computing device receives control information stored in a second memory device of a second computing device, according to block 410. The control information can include flags or data descriptors corresponding to the status and location, respectively, of one or more data buffers. The first computing device can be a consumer device, e.g., the consumer 220 as described with reference to FIG. 2. The second computing device can be the HAM 140, for example as described herein with reference to FIG. 1. In some examples, to receive the control information, the first computing device can poll a respective flag for each of the one or more data buffers, such as the flag F1 described with reference to the first data buffer and FIG. 2. In examples in which a data buffer is newly allocated, the cache for the first computing device can receive initialized values for flags corresponding to the newly allocated data buffer.

The first computing device caches the control information in a first cache at the first computing device, according to block 420.

The first computing device non-coherently reads or writes contents of one or more data buffers of a first memory device based on the control information, wherein the first memory device is shared between the first and second computing device, according to block 430. The first computing device can begin and end reading or writing to the one or more data buffers in response to the values of the one or more flags, as described herein with reference to FIGS. 2-3. The first computing device reads or writes directly into the one or more data buffers, and does not need to create additional copies. Also, the contents of the one or more data buffers are not cached, and so reading or writing according to block 430 does not require checking the contents of the caches of either the first or second computing devices. The operations of reading or writing can be done over the memory channel of the hardware interconnect between the first memory device and the first computing device, instead of over a less efficient channel.

The first computing device coherently writes updated control information to the second memory device, according to block 440. For example, the accelerator writes to the flag S1 as shown in line 218 of FIG. 2, causing the corresponding cache line with the flag in the last level cache of the producer 210, e.g., the host device, to be invalidated and updated.

As described in more detail with reference to FIGS. 5-7, the control information received by the accelerators can include descriptors, including data and command descriptors, indicating the various data buffers for the accelerator or host device to write to or read from.

Figure 5:
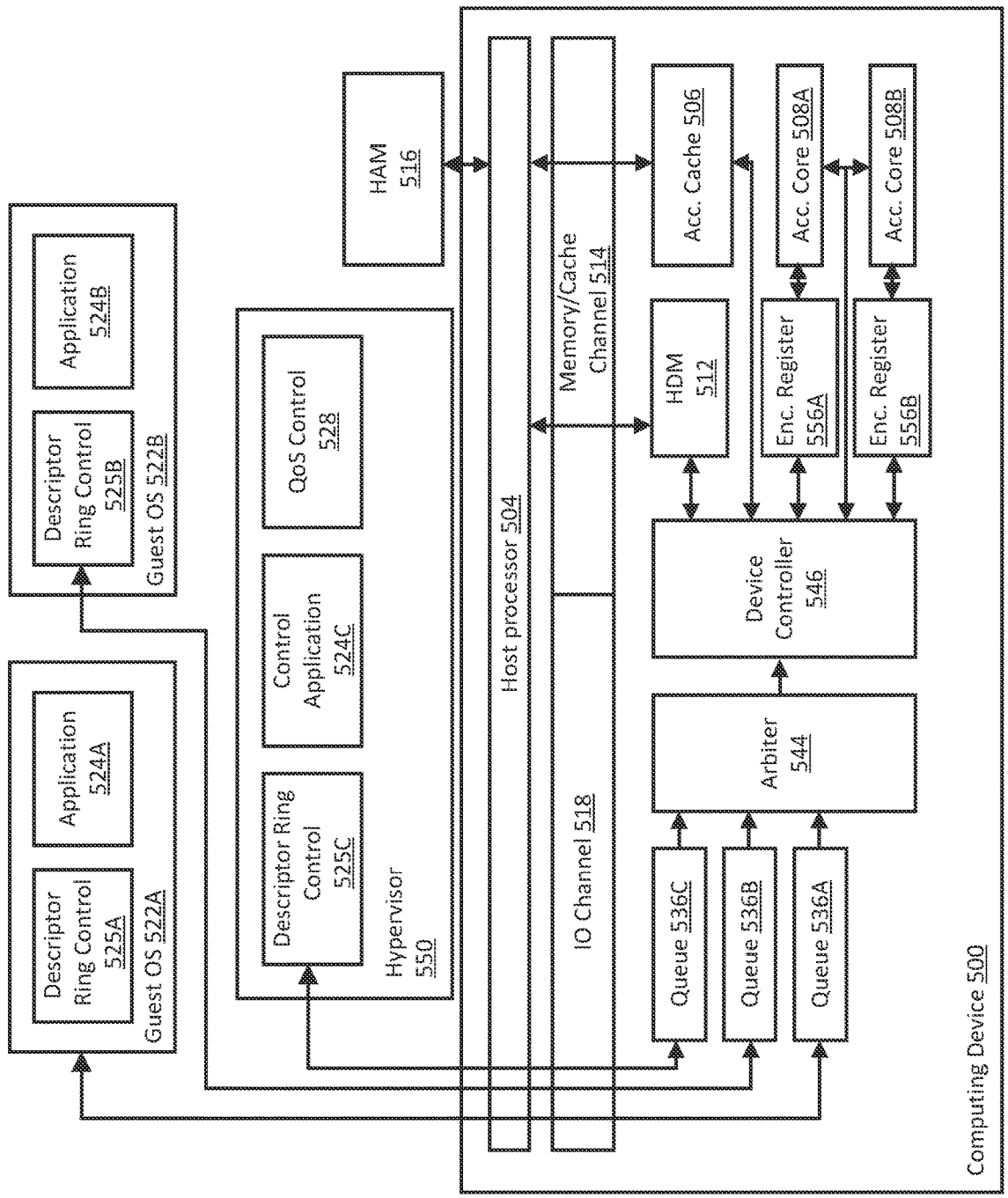
FIG. 5 is a block diagram of a computing device implementing accelerators and a host processor, according to aspects of the disclosure.

FIG. 5 is a block diagram of a computing device 500 implementing accelerators and a host processor 504, according to aspects of the disclosure. The device 500 can include an accelerator cache 506 accessible by accelerator cores (Acc. Cores) 508A-B. The accelerator cores 508A-B can be time-shared, and may have context-free operation.

Contents of the accelerator cache 506 and an HDM 512 can be communicated over a memory/cache channel 514. The memory/cache channel 514 can be a combination of a memory channel and a cache channel as described herein with reference to FIGS. 1-2. In some examples, the channels are separate, e.g., as shown and described with reference to FIG. 1. Host processor 504 can be an example of a host device, e.g., as described herein with reference to FIGS. 1-5. In this example, the computing device 500 includes components for both an accelerator and a host device, communicating over multiple channels according to a protocol described presently with reference to FIGS. 5-7. The computing device 500 can also receive data over an I/O channel 518.

The computing device 500 can receive commands from guest operating systems (guest OSs) 522A-B. The computing device 500 can execute a virtualized platform running a hypervisor 550 and the guest OSs 522A-B. Each guest OS can be implemented on one or more virtual machines. Although shown as separate from the computing device 500, in some examples the computing device 600 is configured to execute one or more virtual machines, which in turn may execute the guest OSs 522A-B. In other examples, the guest OSs 522A-B are instead operating systems executed on bare hardware of one or more computing devices in communication with the computing device 500. For example, the computing device 500 can be a server to a number of client devices. More or fewer guest OSs can communicate with the device 500, according to different examples.

The host processor 504 can be configured to support single-root input/output virtualization, allowing multiple different virtual machines to share the same hardware interconnect.

Guest OSs 522A-B can execute one or more applications 524A-B. The applications 524A-B can be configured to send requests to process data by the computing device 500. Specifically, the applications 524A-B may provide some service or function that involves processing data by the accelerator cores 508A-B. The guest OSs 522A-B can send commands to the computing device 500 as command descriptors.

The host processor 504 can initialize a descriptor table in the HAM 516. The descriptor table can be set up as part of a driver initialization for the accelerator cores 508A-B to communicate with the host processor 504. A descriptor is a unit of data that can include control flags, command information, and physical address (PA) pointers. Each descriptor can be initialized to have a source (SRC) flag and SRC status equal to zero, a (destination) DST flag set to zero, and a (destination) DST status set to one. The flag and status values can correspond to the status of different data buffers whose addresses are stored in the descriptor.

A command descriptor can include an address to a data descriptor in the accelerator cache of the accelerator receiving the command descriptor from its respective command queue. For example, a command descriptor can be 64 bytes, with some amount of reserved space, e.g., 15 bytes, and some amount of space, e.g., 48 bytes, dedicated to the address of the data descriptor. The data descriptor can be larger, e.g., 128 bytes, with an address pointing to the location of a source data buffer in the HDM 512, and another address pointing to the location of the destination data buffer, which can also be in the HDM 512. The contents of the data buffers can be read from or written into over the memory/cache channel 514, for example as described herein with reference to FIGS. 2-3.

Because the command descriptors are smaller than the data descriptors, the command descriptors can be more efficiently transmitted over the I/O channel 518 to the various command queues 536A-C. As part of triggering a command queue update, a command descriptor including a physical address of a data descriptor specifying the command to perform on the accelerator is sent over the I/O channel. The command descriptor can be sent as one or more DMWr (deferred memory write) transactions. The data descriptor can include semaphore flags, a command, e.g., an indication of what operation to perform on the contents or the source or destination buffer, and a buffer source and destination address information. In a DMWr transaction, no write completion is sent in response to indicate that the write was successful. In other words, command descriptors can be sent faster over the relatively inefficient I/O channel, to allow for more data to instead be read or written more efficiently over the cache and memory channels, as described herein.

Each accelerator core 508A-B communicates with a respective command queue 536A-B, which stores commands issued from the applications and distributed to enqueue registers 556A-B according to an arbiter 544 and through a device controller 546. Each Guest OS 522A-B can implement a circular ring descriptor buffer 525A-B or another type of data structure for managing commands queued by the applications 524A-B. The ring descriptor buffers 525A-B maintain pending command descriptors not yet sent to a command queue of an accelerator.

The hypervisor 550 causes command descriptors to be enqueued in the command queues of the various accelerator cores 508A-B. The hypervisor 550 can include a descriptor ring control 525C configured to store command descriptors before they are enqueued at command 536C. The hypervisor 550 can also implement a control application 524C configured to control operations of the hypervisor 550, and a quality of service (QoS) controller 528 configured to manage the policy of the arbiter 544 in enqueuing command descriptors.

The cores 508A-B reads the physical address included in a command descriptor in an enqueue register to read the data descriptor in the accelerator cache. The cores 508A-B fetch physical addresses for source and destination data buffers from the data descriptor from the accelerator cache 506. The accelerator cores 508A-B translate buffer physical addresses to local interconnect physical addresses.

The accelerator cores 508A-B update, e.g., set or clear appropriate control flags in the data descriptor stored in the accelerator cache 506, to indicate when processing starts, e.g., that the source buffer has been read, and when processing ends, e.g., that the destination buffer has been written. The accelerator cores 508A-B can then poll the enqueue registers 556A-B for the next command descriptors, provided by the device controller 546 through the arbiter 544.

Figure 6A:
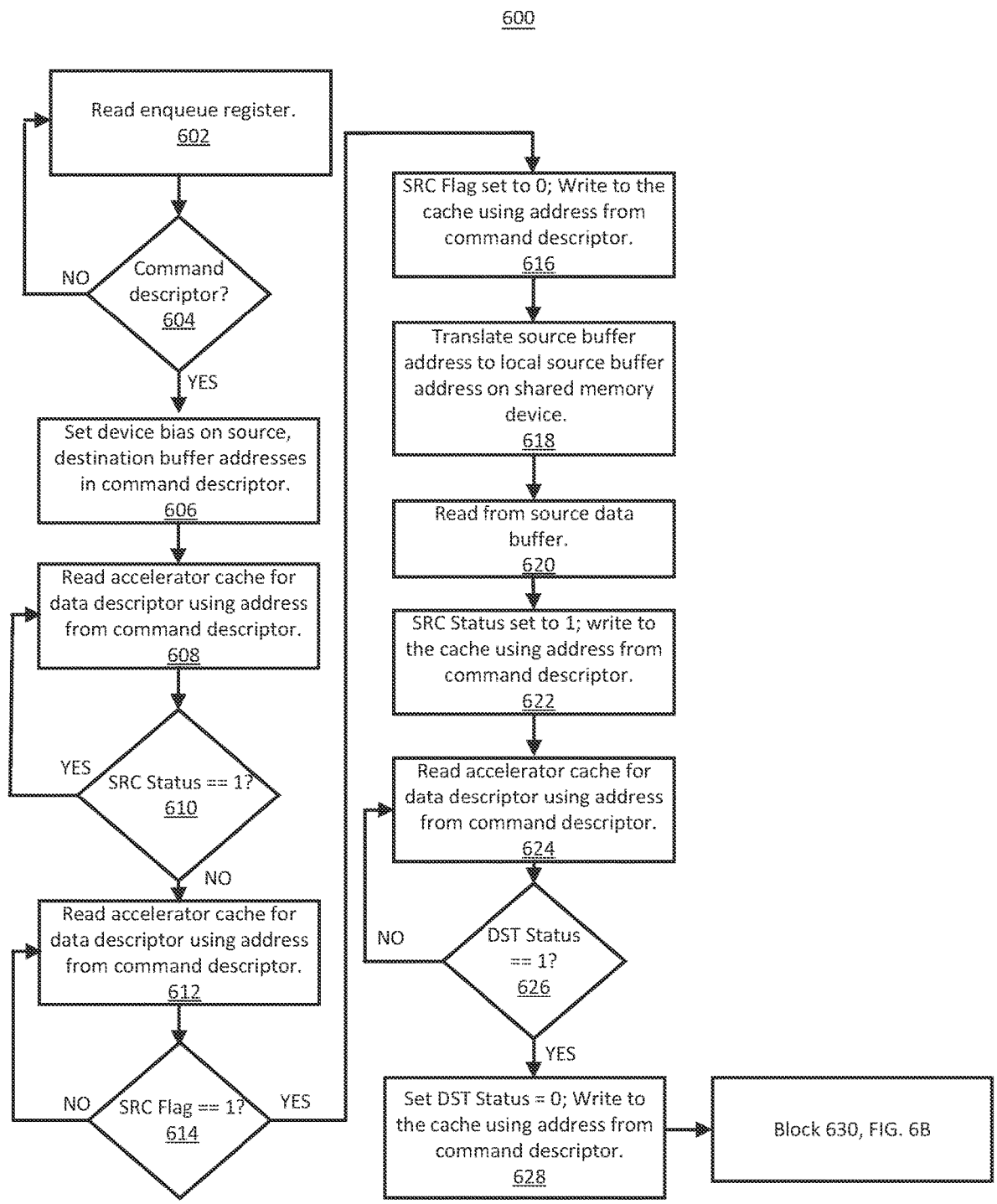
FIGS. 6A and 6B show a flow chart of an example process 600 for processing enqueued command descriptors, according to aspects of the disclosure.
Figure 6B:
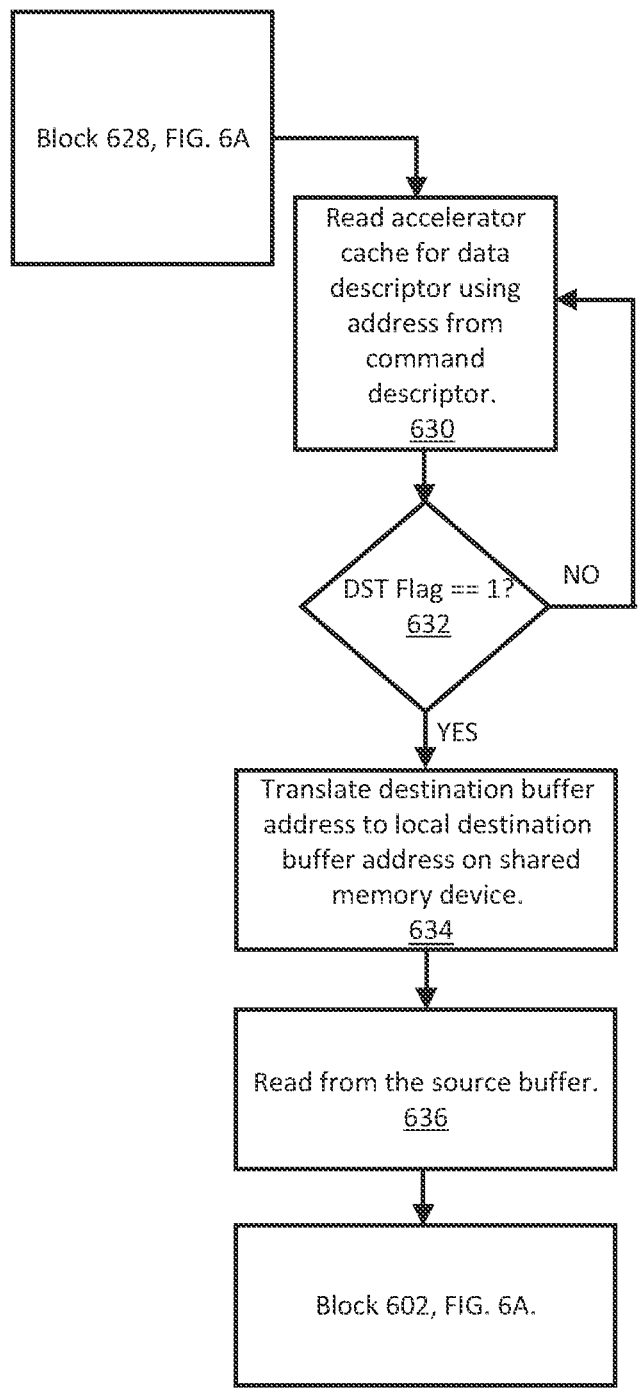

Further improvements can be achieved through the use of partial cache updates In addition, a single cache line fetch can transfer multiple command descriptors, because multiple command descriptors can fit in a single cache line. Poll mode on local interconnect and the use of enqueue registers can also reduce latency of operation FIGS. 6A-B shows a flow chart of an example process 600 for processing enqueued command descriptors, according to aspects of the disclosure.

The accelerator reads an enqueue register, according to block 602. The accelerator checks for a command descriptor in the register, according to diamond 604. Upon detecting a command descriptor ("YES" from diamond 604), the accelerator sets the device bias using the source and destination buffer addresses, according to block 606.

The accelerator reads the accelerator cache for the data descriptor whose address is specified by the command descriptor, according to block 608. According to diamond 610, the accelerator checks if the SRC status flag is set to 1, and if so ("YES"), continues to read the accelerator cache. If the SRC status flag is not set to 1 ("NO"), then the reads from the accelerator cache for the data descriptor using addresses from the command descriptor, according to block 612.

According to diamond 614, the accelerator checks if the SRC flag is set to 1. If not ("NO"), the accelerator continues to read the accelerator cache. Otherwise ("YES"), the accelerator sets the SRC flag to 0, by writing to the cache using the address from the command descriptor address, according to block 616.

The accelerator translates the address of the source data buffer address to a local source data buffer address, the local source data buffer address corresponding to the physical address for the source data buffer in the shared memory device, according to block 618. The accelerator reads from the source buffer, according to block 620.

The accelerator sets the SRC status to 1 and writes to the cache using the address from the command descriptor, according to block 622.

The accelerator reads from the accelerator cache for the data descriptor using the address from the command descriptor, according to block 624.

According to diamond 626, the accelerator checks if the DST status flag is set to 1, and if not ("NO"), continues to read the accelerator cache. If the DST status flag is set to 1 ("YES"), then the accelerator sets the DST status flag to 0 and writes to the cache using the address from the command descriptor, according to block 628.

The accelerator reads from the accelerator cache for the data descriptor using the address from the command descriptor, according to block 630.

According to diamond 632, the accelerator checks if the DST flag is set to 1. If not ("NO"), the accelerator continues to read the accelerator cache. Otherwise ("YES"), the accelerator translates the address of the destination data buffer address to a local destination data buffer address, the local destination data buffer address corresponding to the physical address for the destination data buffer in the shared memory device, according to block 634. The accelerator reads from the source buffer, according to block 636, and the process 600 can begin for the new command descriptor in the enqueue register, according to block 602.

The control process 600 can have a number of technical advantages. First, the use of a command descriptor to send the address of a data descriptor reduces the amount of data needed to transmit over the I/O channel, which is generally less efficient than the memory and cache channels of the hardware interconnect. Multiple command descriptors can be sent through a single DMWr transaction, further improving the rate at which commands and relevant data for performing those commands are passed to the accelerators. The data descriptor specified in the command descriptor can be fetched over the cache channel, and the contents of the source/destination data buffers whose addresses are indicated in the data descriptor can be fetched non-coherently over the memory channel. In some examples, this fetching can be done using the process 200, 300 described herein with reference to FIGS. 2-3, taking advantage of the improved data transmission as previously discussed.

Figure 7:
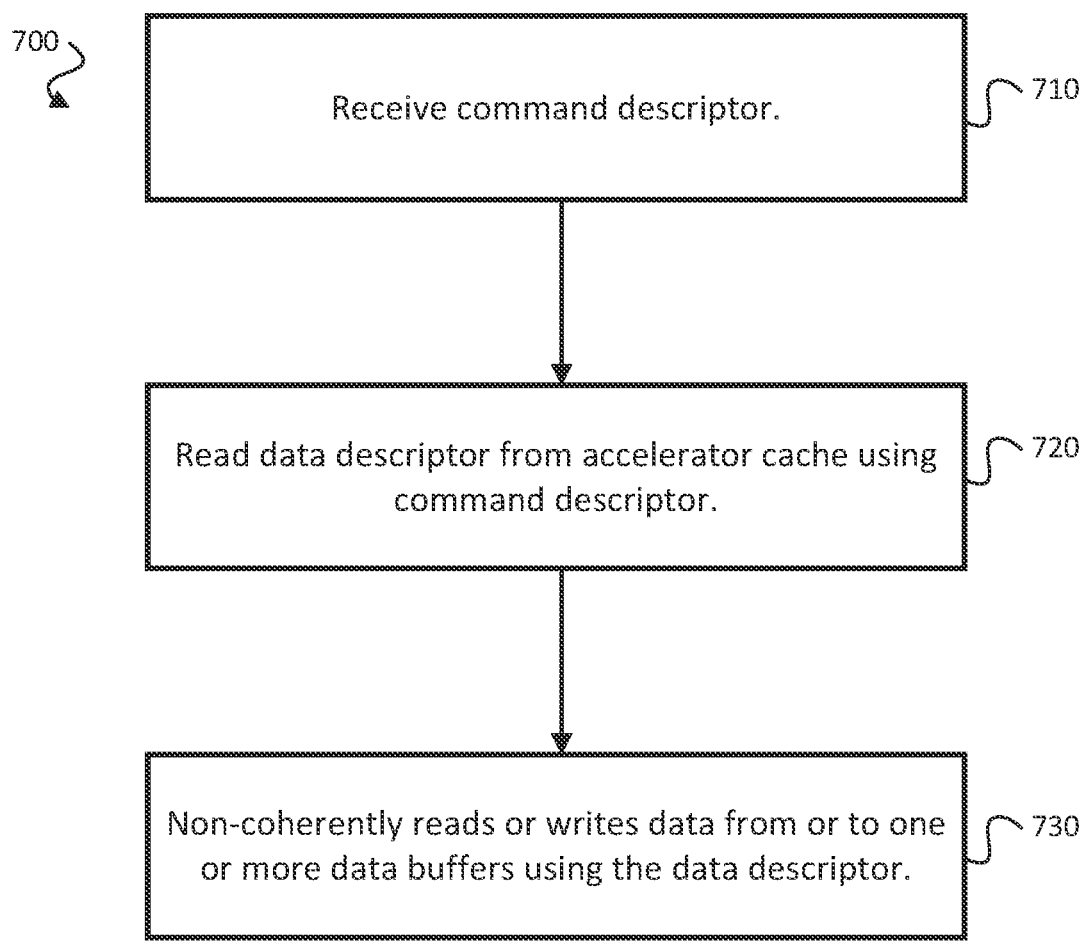
FIG. 7 is a flowchart of an example control process for processing data on a system including a host device and an accelerator communicatively coupled over a hardware interconnect, according to aspects of the disclosure.

FIG. 7 is a flowchart of an example control process 700 for receiving and processing a command descriptor by an accelerator, according to aspects of the disclosure.

The accelerator receives a command descriptor, according to block 710. The command descriptor can be received from an enqueue register coupled to the accelerator, the accelerator configured to poll the register for new command descriptors. Multiple command descriptors can be received, for example using a single DMWr transaction, as described herein with reference to FIG. 5. The command descriptors can be received from one or more virtual machines communicatively coupled to the accelerator.

The accelerator reads a data descriptor using the command descriptor, from an accelerator cache, according to block 720. The command descriptor can include an address for the data descriptor, which the accelerator can use to identify the data descriptor in the accelerator cache.

The accelerator non-coherently reads or writes data from or to one or more data buffers using the data descriptor, according to block 730. The addresses for the one or more data buffers can be specified in the data descriptor. For example, the one or more data buffers can be in a shared memory device between the accelerator and a host device. The accelerator can be configured to read or write contents of the data buffers, for example, using the processes 200-300 as described herein with reference to FIGS. 2-3.

Figure 8:
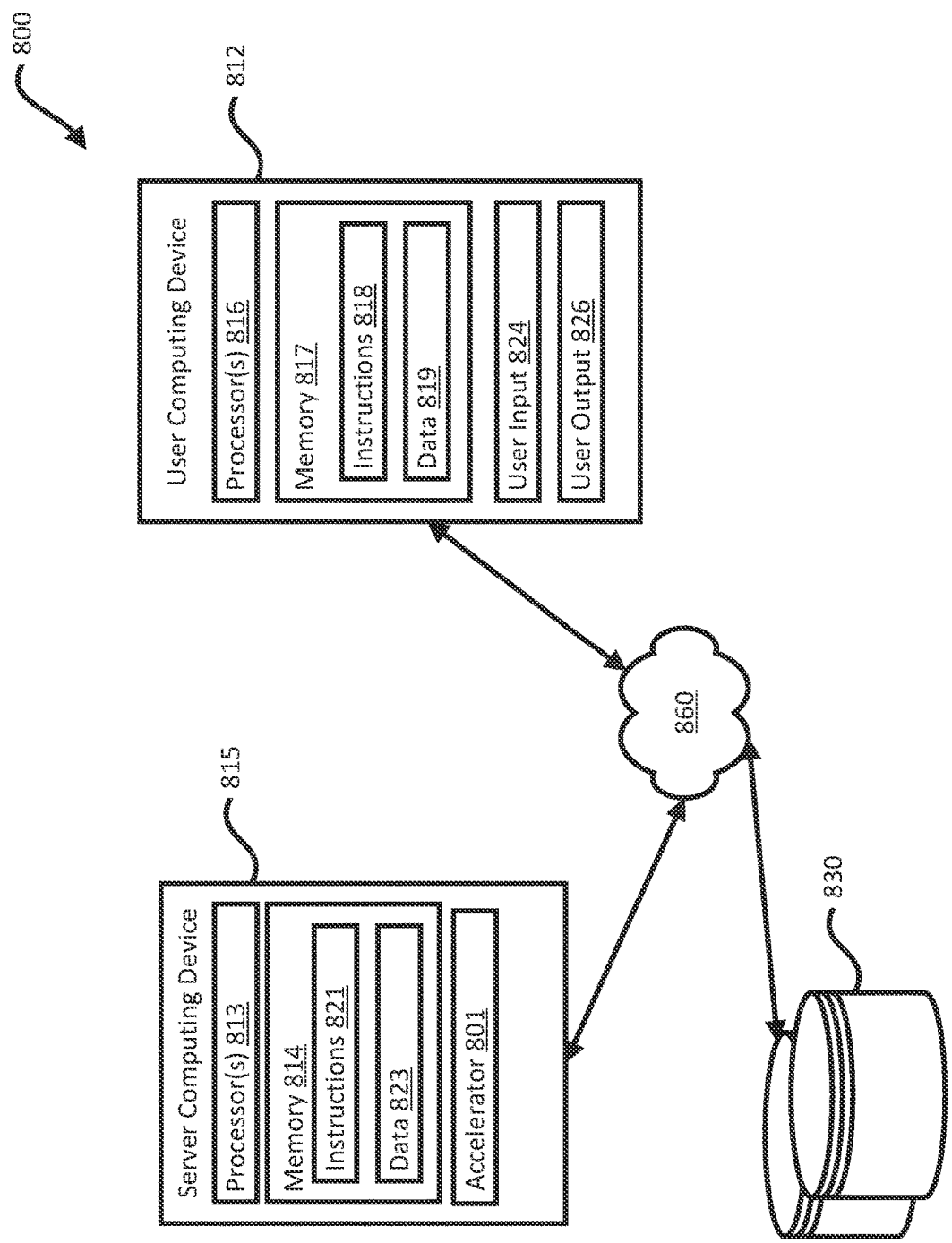
FIG. 8 is a block diagram of an example environment for implementing accelerators and host devices for memory-coherent data transmission, according to aspects of the disclosure.

FIG. 8 is a block diagram of an example environment 800 for implementing accelerators and host devices for memory-coherent data transmission, according to aspects of the disclosure. Server computing device 815 can be an example host device housing an accelerator 800. The server computing device 815 can include multiple accelerators, including the accelerator 801. In some examples, the server computing device 800 can be connected over a hardware interconnect (not shown) with a plurality of other types of devices configured to transmit data over the hardware interconnect 801. The hardware interconnect 801 can include a combination of software and hardware for transmitting data across a data bus according to one or more data transmission protocols.

As described herein with reference to FIG. 1, compatible devices can implement agents or other digital circuits configured to prepare and transmit data over the data bus, in accordance with protocols associated with the hardware interconnect 125.

User computing device 812 and the server computing device 815 can be communicatively coupled to one or more storage devices 830 over a network 860. The storage device(s) 830 can be a combination of volatile and non-volatile memory, and can be at the same or different physical locations than the computing devices 812, 815. For example, the storage device(s) 830 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 818 can include one or more processors 813 and memory 814. The memory 814 can store information accessible by the processor(s) 813, including instructions 821 that can be executed by the processor(s) 813. The memory 814 can also include data 823 that can be retrieved, manipulated or stored by the processor(s) 813. The memory 814 can be a type of non-transitory computer readable medium capable of storing information accessible by the processor(s) 813, such as volatile and non-volatile memory. The processor(s) 813 can include one or more central processing units (CPUs), graphic processing units (GPUs), field-programmable gate arrays (FPGAs), and/or application-specific integrated circuits (ASICs), such as tensor processing units (TPUs) or video processing units (VPUs).

The instructions 821 can include one or more instructions that when executed by the processor(s) 813, causes the one or more processors to perform actions defined by the instructions. The instructions 821 can be stored in object code format for direct processing by the processor(s) 813, or in other formats including interpretable scripts or collections of independent source code modules that are interpreted on demand or compiled in advance. The instructions 821 can include instructions for implementing at least portions of the hardware interconnect 801 between the accelerator 800 and the server computing device 815.

The data 823 can be retrieved, stored, or modified by the processor(s) 813 in accordance with instructions 821. The data 823 can be stored in computer registers, in a relational or non-relational database as a table having a plurality of different fields and records, or as JSON, YAML, proto, or XML documents. The data 823 can also be formatted in a computer-readable format such as, but not limited to, binary values, ASCII, or Unicode. Moreover, the data 823 can include information sufficient to identify relevant information, such as numbers, descriptive text, proprietary codes, pointers, references to data stored in other memories, including other network locations, or information that is used by a function to calculate relevant data.

The user computing device 812 can also be configured similar to the server computing device 815, with one or more processors 816, memory 817, instructions 818, and data 819. The user computing device 812 can also include a user output 826, and a user input 824. The user input 824 can include any appropriate mechanism or technique for receiving input from a user, such as from a keyboard, mouse, mechanical actuators, soft actuators, touchscreens, microphones, and sensors.

The server computing device 815 can be configured to transmit data to the user computing device 812, and the user computing device 812 can be configured to display at least a portion of the received data on a display implemented as part of the user output 826. The user output 826 can also be used for displaying an interface between the user computing device 812 and the server computing device 815. The user output 826 can alternatively or additionally include one or more speakers, transducers, or other audio outputs, a haptic interface or other tactile feedback that provides non-visual and non-audible information to the platform user of the user computing device 812.

Although FIG. 8 illustrates the processors 813, 816 and the memories 814, 817 as being within the computing devices 815, 812, components described in this specification, including the processors 813, 816 and the memories 814, 817 can include multiple processors and memories that can operate in different physical locations and not within the same computing device. For example, some of the instructions 821, 818 and the data 823, 819 can be stored on a removable SD card and others within a read-only computer chip. Some or all of the instructions and data can be stored in a location physically remote from, yet still accessible by, the processors 813, 816. Similarly, the processors 813, 816 can include a collection of processors that can perform concurrent and/or sequential operation. The computing devices 815, 812 can each include one or more internal clocks providing timing information, which can be used for time measurement for operations and programs run by the computing devices 815, 812.

The server computing device 815 can be configured to receive requests to process data from the user computing device 812. For example, the environment 800 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 512 may receive and transmit data specifying target computing resources to be allocated for executing a neural network trained to perform a particular neural network task.

The devices 812, 815 can be capable of direct and indirect communication over the network 860. The devices 815, 812 can set up listening sockets that may accept an initiating connection for sending and receiving information. The network 860 itself can include various configurations and protocols including the Internet, World Wide Web, intranets, virtual private networks, wide area networks, local networks, and private networks using communication protocols proprietary to one or more companies. The network 860 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 860, in addition, or alternatively, can also support wired connections between the devices 812, 815, including over various types of Ethernet connection.

Although a single server computing device 815, user computing device 512 are shown in FIG. 8, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a host device and an accelerator communicatively coupled over a hardware interconnect supporting memory-coherent data transmission between the host device and the accelerator, the host device comprising a host cache and the accelerator comprising an accelerator cache;
wherein the host device is configured to:
read or write data to one or more data buffers to a first memory device shared between the host device and the accelerator,
write control information to a second computing device, the control information comprising one or more flags indicating the status of one or more data buffers in the first memory device,
wherein the accelerator is configured to:
non-coherently read or write data from or to the one or more data buffers of the first memory device based on the control information, and after non-coherently reading or writing the data, coherently write updated control information to the second memory device, wherein coherently writing the updated control information causes the control information in the host cache to be updated, wherein the accelerator is further configured to receive, at an enqueue register, one or more command descriptors, each command descriptor specifying a respective data descriptor in the accelerator cache, and wherein to non-coherently read or write data from or to the one or more data buffers, the accelerator is configured to read addresses from the one or more command descriptors corresponding to the one or more data descriptors.

2. The system of claim 1, wherein the accelerator is configured to receive the one or more command descriptors as a deferred memory write (DMWr) transaction.

3. The system of claim 1, wherein the one or more command descriptors are received from an application executed on a virtual machine hosted by the host device.

4. The system of claim 1, wherein hardware interconnect comprises a plurality of channels; and wherein the accelerator is configured to:

receive the one or more command descriptors over a first channel of the plurality of channels dedicated to input/output data communication; and non-coherently read or write data from or to the one or more data buffers over a second channel of the plurality of channels dedicated to communication between memory devices connected to the first or second computing devices.

5. The system of claim 4, wherein to coherently write the updated control information to the second memory device, the accelerator is further configured to cause the updated control information to be sent to the host cache of the host device over a third channel of the plurality of channels dedicated to updating contents of the accelerator or host cache.

6. A first computing device comprising:

a first cache; and one or more processors coupled to a first memory device shared between the first computing device and a second computing device, the one or more processors are configured to:

cache control information in the first cache, the control information comprising one or more flags indicating the status of one or more data buffers in the memory device and accessed from a second memory device connected to the second computing device; and non-coherently read or write contents of the one or more data buffers based on the control information, and after non-coherently reading or writing the contents of the one or more buffers, coherently write updated control information to the second memory device, wherein coherently writing the updated control information causes the control information in the first or second cache to also be updated, wherein the first computing device is configured to communicate with the second computing device over a hardware interconnect comprising a plurality of channels and configured for memory-coherent data transmission, wherein the one or more processors are further configured to:

coherently read or write the control information over a first channel dedicated to input/output (I/O) data communication; and non-coherently read or write the contents of the one or more data buffers over a second channel dedicated to communication between memory devices connected to the first or second computing device, wherein to coherently write the updated control information to the second memory device, the one or more processors are configured to cause the updated control information to be sent to the second cache of the second memory device over a third channel dedicated to updating contents of the first or second cache, and wherein the one or more processors are further configured to:

receive, over the I/O channel, a command descriptor, the command descriptor comprising respective addresses for a source data buffer and a destination data buffer in the first memory device;

cache the respective addresses for the source and destination data buffers to the first cache; and non-coherently read or write the contents of the source and destination data buffer using the respective cached addresses.

7. The first computing device of claim 6, wherein the first computing device is a hardware accelerator device comprising one or more accelerator cores and the first cache is an accelerator cache for the hardware accelerator device.

8. The first computing device of claim 7, wherein the one or more processors are configured to non-coherently read the contents of the one or more data buffers based on the value of one or more of the plurality of flags indicating that the contents of the one or more data buffers are ready for consumption.

9. The first computing device of claim 8, wherein the one or more of the plurality of flags are set by the second computing device configured to write the contents to the one or more data buffers.

10. The first computing device of claim 6, where the control information further comprises data descriptors, each data descriptor identifying an address for a respective source data buffer for the first computing device to read from, or for a respective destination data buffer for the first computing to write to.

11. One or more non-transitory computer-readable storage media encoded with instructions that, when executed by one or more processors of a first computing device comprising a first cache and coupled to a first memory device shared between the first computing device and a second computing device, causes the one or more processors to perform operations comprising:

caching control information in the first cache, the control information comprising one or more flags indicating the status of one or more data buffers in the memory device and accessed from a second memory device connected to the second computing device; and non-coherently reading or writing contents of the one or more data buffers based on the control information, and after non-coherently reading or writing the contents of the one or more buffers, coherently write updated control information to the second memory device, wherein coherently writing the updated control information causes the control information in the first or second cache to also be updated, wherein the first computing device is configured to communicate with the second computing device over a hardware interconnect comprising a plurality of channels and configured for memory-coherent data transmission, wherein the operations further comprise:
coherently reading or writing the control information over a first channel dedicated to input/output (I/O) data communication, and non-coherently reading or writing the contents of the one or more data buffers over a second channel dedicated to communication between memory devices connected to the first or second computing device, wherein coherently writing the updated control information to the second memory device comprises causing the updated control information to be sent to the second cache of the second memory device over a third channel dedicated to updating contents of the first or second cache, and wherein the operations further comprise:
receiving, over the I/O channel, a command descriptor, the command descriptor comprising respective addresses for a source data buffer and a destination data buffer in the first memory device;

caching the respective addresses for the source and destination data buffers to the first cache; and non-coherently reading or writing the contents of the source and destination data buffer using the respective cached addresses.

12. The non-transitory computer-readable storage media of claim 11, wherein the first computing device is a hardware accelerator device comprising one or more accelerator cores and the first cache is an accelerator cache for the hardware accelerator device.

13. The non-transitory computer-readable storage media of claim 12, wherein the operations further comprise non-coherently reading the contents of the one or more data buffers based on the value of one or more of the plurality of flags indicating that the contents of the one or more data buffers are ready for consumption.

* * * * *